United States Patent

Engdahl et al.

[11] Patent Number: 6,112,764
[45] Date of Patent: Sep. 5, 2000

[54] AUTOMATIC SAFETY SHUTOFF VALVE

[75] Inventors: Paul D. Engdahl, 2930 Grace La., Suite 'E', Costa Mesa, Calif. 92626; Roger P. Engdahl, Costa Mesa, Calif.

[73] Assignee: Paul D. Engdahl, Costa Mesa, Calif.

[21] Appl. No.: 08/901,682

[22] Filed: Jul. 28, 1997

[51] Int. Cl.[7] .................................................. F16K 37/00
[52] U.S. Cl. ........................... 137/554; 137/38; 137/559; 251/65
[58] Field of Search ........................... 137/38, 554, 559; 251/65

[56] References Cited

U.S. PATENT DOCUMENTS

| | | | |
|---|---|---|---|
| 3,857,277 | 12/1974 | Moore | 137/559 |
| 4,207,912 | 6/1980 | Icikawa | 137/39 |
| 4,844,113 | 7/1989 | Jones | 137/39 |
| 5,052,429 | 10/1991 | Yoo | 137/38 |
| 5,115,829 | 5/1992 | Frazke | 137/38 |
| 5,209,454 | 5/1993 | Engdahl et al. | 137/38 |
| 5,307,699 | 5/1994 | Engdahl et al. | 137/45 |

*Primary Examiner*—A. Michael Chambers
*Attorney, Agent, or Firm*—Lawrence Fleming

[57] ABSTRACT

A flapper-type gas valve automatically closable by accelerations characteristic of earthquakes. The arm is held up in the "valve open" position by a magnet attracting a soft ferromagnetic armature. The armature can be displaced to release the flapper to close the valve, either by seismic accelerations or manually by novel magnetic means—the latter for testing or for non-seismic emergencies. The latter employ movable permanent magnets or electromagnets. Additional magnets are provided to hold the valve closed. Indicating means on the flapper shaft can be viewed through a window to see the valve status—open or closed. The electromagnetic modification provides remote status indication via a magnetically-actuated switch.

5 Claims, 2 Drawing Sheets

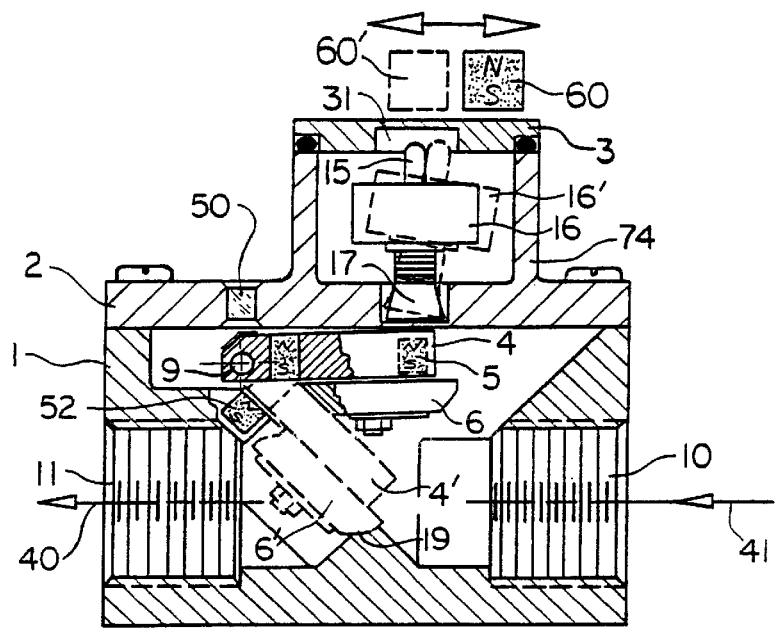
FIG.1
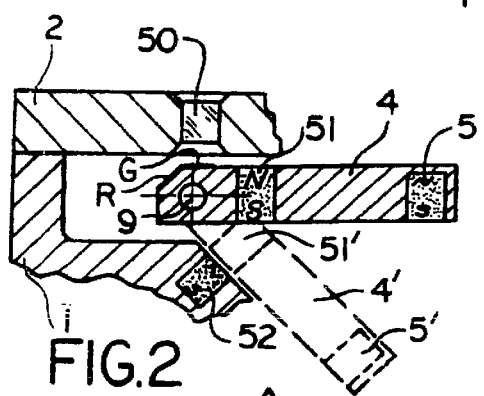
FIG.2
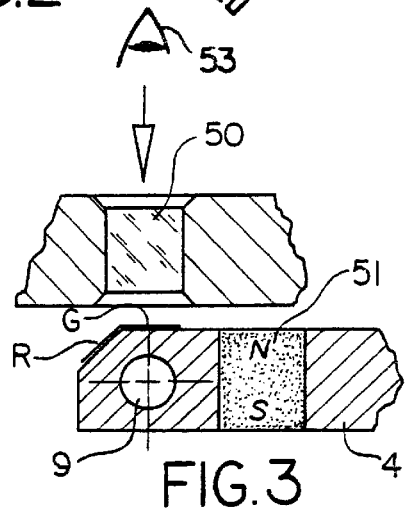
FIG.3
FIG.4

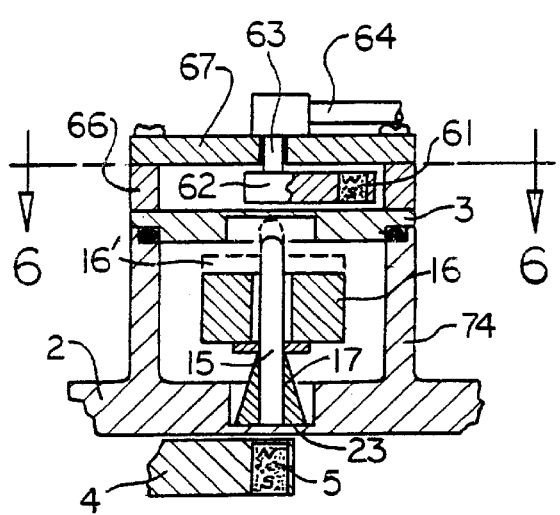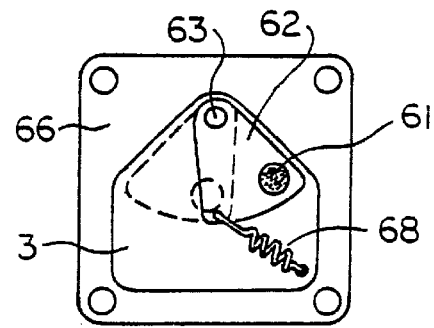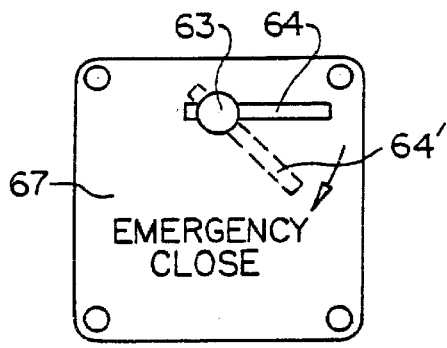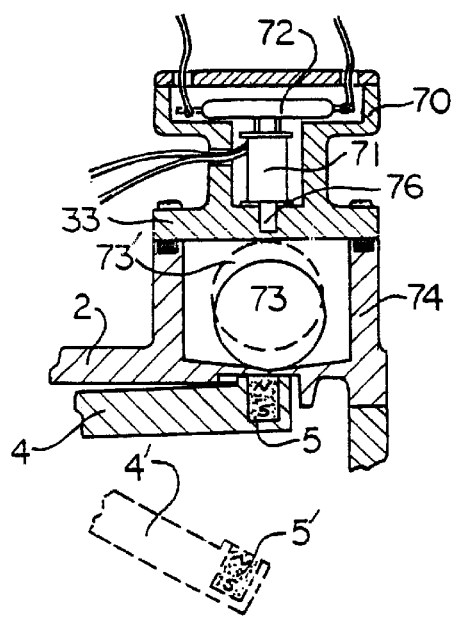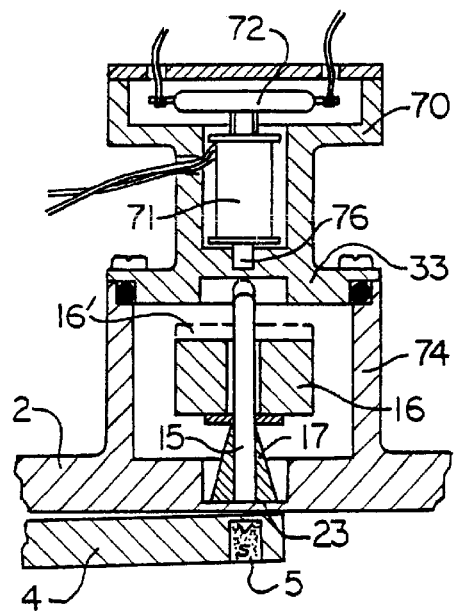
FIG. 5
FIG. 6
FIG. 7
EMERGENCY CLOSE
FIG. 9
FIG. 8

AUTOMATIC SAFETY SHUTOFF VALVE

FIELD OF THE INVENTION

This invention relates to valves which close automatically when subjected to a mechanical disturbance of predetermined character and exceeding a predetermined magnitude, in particular, gas valves which close automatically when subjected to accelerations characteristic of earthquakes.

RELATED ART

The present invention relates to valves of the kind shown in my prior U.S. Pat. Nos. 5,209,454 and 5,307,699. These show in-line valves of the swinging-arm or "flapper" type where the arm is held in the "open" position by magnetic attraction and swings downward to the "closed" position when that attraction is suitably reduced by the inertial displacement of a magnetic element.

Following is the closest other prior art of which I am aware. U.S. Pat. Nos. 4,603,591 to Sibley et al; 4,844,113 to Jones; 5,409,031 to McGill et al, and 5,115,829 to Franzke show such in-line valves of the swinging arm or "flapper" type. In Franzke the arm is held up in the "open" position by magnetic means; acceleration imparts relative displacement to a ferromagnetic ball, reducing the magnetic attraction and releasing the arm. In Sibley et al, Jones, and McGill the arm is retained in the "open" position by mechanical means and released to drop into the "closed" position by mechanical means via the inertial displacement of a ball. U.S. Pat. No. 4,889,150 to Lloyd et al shows an earthquake-closable gas valve where the ball itself covers an orifice after being displaced by inertia.

BRIEF SUMMARY

The present invention is an improvement in the valves shown in my aforementioned prior U.S. Pat. Nos. 5,209,454 and 5,307,699. The improvements reside in novel means for providing visual indication of the valve's status—open or closed; magnetic means for assisting gravity in holding the valve closed; and magnetic means for closing the valve in case, e.g., of a non-seismic emergency.

To provide "open-or-closed" status indication, two substantially flat adjacent surfaces or facets are provided at the shaft end of the swinging arm. These surfaces are disposed at angles such that one is substantially horizontal when the valve is open, the other horizontal when the valve is closed. They may be colored, e.g., green and red respectively. A window is provided in the top portion of the valve housing through which these surfaces can be viewed, so that, e.g., "red visible" indicates that the valve is closed, "green" that it is open.

An American National Standards Institute standard on gas valves, No.Z21.70-1981, requires that valves be "provided with a means, other than gravity, to maintain a continuous seat force . . . " The present invention provides a magnetic "hold-closed" means comprising a small magnet in the swinging arm near its shaft end, and another magnet located opposably in the valve body, their mutual attraction being directed to holding the arm down, i.e., the valve closed. This attraction decreases rapidly as the arm swings toward the "open" position, becoming negligibly small—as is desirable—when the valve is open. This desirable characteristic would not be attained with a spring.

To close the valve by a manual or electrical input, as for test or emergency purposes, magnetic means are provided to displace an element such as a pin-and-mass armature element to effect release of a "hold open" magnet on the swinging arm; such an armature is shown for example at 15, 16, 17 in my prior U.S. Pat. No. 5,307,699. A manual closing means employs a movable permanent magnet. Electrical means use an electromagnet, preferably with an adjacent magnetic reed switch or the like disposed to be closed when the valve is open, to permit remote indication of the valve's status.

IN THE DRAWINGS

FIG. 1 is a side sectional view of a valve according to the invention, with a magnetic closing means indicated diagrammatically;

FIG. 2 is a side sectional detail view of the flapper arm or swinging arm in the open position, showing magnets and status indicator facets;

FIGS. 3 and 4 are enlarged side sectional details of the status indicator in the open and closed positions respectively;

FIG. 5 is a side sectional detail view of the armature portion of a valve with a manual magnetic closing means;

FIG. 6 is a section on line 6—6 of FIG. 5;

FIG. 7 is a top view of FIG. 5;

FIG. 8 is a side sectional view of a modification of FIG. 5 with an electromagnet; and FIG. 9 is a side sectional view of a modification of FIG. 8.

DETAILED DESCRIPTION

In FIG. 1, the basic valve structure may be the same as that shown in FIG. 1 of my prior U.S. Pat. No. 5,307,699. A valve body 1 has an inlet port 10, an outlet port 11, and a valve seat 19. A flapper arm 4 is swingably pivoted on a shaft 9, and carries a sealing element 6. This arm 4 is adapted to swing downward in response to an earthquake or other predetermined stimulus so that the sealing element 6 engages the valve seat 19, closing the valve. The arm 4 with sealing element 6 in the closed position is indicated in dashed lines in FIG. 1 at 4', 6'. Arrows 40,41 indicate direction of flow.

The direct means for causing the arm to swing downward to close the valve is the displacement of an armature having a pin 15 that is pressed into a foot portion 17, both of soft ferromagnetic material, and an inertial mass 16, that is housed loosely in a compartment portion 74 of a cover 2 which covers the main valve body 1. This compartment portion is provided with its own cover 3, which has a cavity 31. According to the invention, a magnet 5 is embedded in the flapper arm 4. This magnet 5 may be of the known rare earth composition, and is shown best in FIGS. 2, 5, 8, and 9. The arm 4 is held up in the normal "open" position by the attraction of magnet 5 to the foot portion 17 of the armature.

When the magnetic path between elements 5 and 17 is lengthened as by tilting the armature or by raising it upward, the attraction becomes too weak to hold the arm 4 up, and arm 4 swings downward by gravity to the "closed" position. This closed position is indicated in broken lines in FIG. 1 at 4', 6'. A tilted position of the armature is indicated in broken lines at 16' in FIG. 1. This portion of the structure is described in detail in my prior U.S. Pat. No. 5,307,699, and so is described here only briefly, for clarity.

In the present FIG. 1, a means is indicated for intentionally closing the valve by lifting or raising the armature upward with a magnet 60, which is shown in the inactive position with the valve open. To close the valve, magnet 60 may be moved to a position 60' directly above the armature pin element 15, pulling the element 15 upward. Novel means to effect this is shown in FIGS. 5–7, to be described in detail below.

In the present invention there are two magnets on the flapper arm 4, shown best in FIG. 2. Here, magnet 5 is the "hold open" magnet. Another magnet 51 is now provided to hold the arm 4 in the downward position to hold the valve closed, as required by the ANSI standard identified above. Magnet 51 works in cooperation with another magnet 52, poled to attract magnet 51, and located in the valve body 1, FIG. 2. Valve body 1 is normally made of non-magnetic material. The "closed" position of arm 4 is indicated in FIG. 2 in dashed lines at 4', with magnets 5' and 51'.

A particular advantage of the magnetic means for holding the valve closed is that the holding force is at a maximum when the valve is closed, but decreases rapidly as a function of distance when the valve opens. Thus, when the valve is open the "hold closed" magnetic means 51, 52 has very little effect on the forces required to close the valve.

Indicated in FIG. 2 but shown better in FIGS. 3 and 4 is the novel visual means for indicating the status of the valve-open or closed. Two surfaces, preferably flat, are provided on the base or shaft end portion of arm 4. These are indicated at R and G; they may be colored red and green respectively. Surface or facet G is substantially horizontal when the arm 4 is up in the "closed" position, FIG. 3; and surface R about horizontal when the valve is closed, FIG. 4. A window 50 is provided in the case cover 2 through which to view surfaces R and G, FIGS. 1–4. An eye position is indicated at 53 in FIGS. 3–4.

FIGS. 5–7 show a novel structure and mechanism for magnetically raising the armature 15–17 to close the valve, for purposes of testing or in non-seismic emergencies. A housing 66 with a cover 67 is provided atop the case cover portion 74. Inside housing 66 is a magnet carrier 62 fixed to a shaft 63 and carrying a magnet 61, FIG. 6. A return spring 68 is provided. When shaft 63 is rotated through a comparatively small angle, say 20°, it positions magnet 61 above a central portion of case portion 3. When positioned there it attracts armature pin 15 and pulls the armature upward, FIG. 5, allowing arm 4 to drop down and close the valve. The "up" position of the armature is indicated at 16' in FIG. 5.

FIG. 7 is a top view of FIG. 5, and shows the "close valve" operating lever 64 on shaft 63. To close the valve, lever 64 is moved momentarily to a position 64'. The closed status of the valve may be seen through window 50, FIGS. 1–4. Spring 68 then returns the magnet 61 to its original inactive position.

The valve may then be reopened by turning the flapper arm shaft 9, as with a screwdriver applied to a slot in the end of the shaft. This resetting means is shown best at 20 in FIGS. 1–4 of my prior U.S. Pat. No. 5,209,454.

FIGS. 8 and 9 show modifications of the invention where emergency closure of the valve is effected by energizing an electromagnet. In FIG. 8, the case cover 2 with armature housing portion 74, the armature 15–17, the arm 4, and the rest of the valve assembly may be the same as in FIG. 1.

The present invention, FIG. 8, provides an electromagnet 71 and a magnetically-actuated switch 72; these are mounted in a suitable housing indicated at 33 which has an upper portion 70 suitably designed to hold the above elements 71 and 72. The electromagnet 71 may be energized from a suitable remote location, lifting the armature 15–17 upward and away from holding magnet 5 in arm 4 and allowing the arm 4 to drop downward and close the valve in the manner described above. The raised position of the armature in FIG. 8 is indicated at 16'. In FIG. 8, when the arm 4 is in the "up" position (valve open), its magnet 5 magnetizes the soft ferromagnetic pin portion 15 of the armature (which is pressed into soft ferromagnetic foot portion 17). The core 76 of electromagnet 71, being adjacent the tip of pin portion 15, also gets magnetized; and its magnetic field is available to actuate the magnetic switch 72. Switch 72 may be a reed switch. But when the armature is lifted momentarily by a momentary energization of electromagnet 71, the arm 4 with its magnet 5 swings down and away; as soon as the electromagnet 71 is deenergized the pin 15 becomes demagnetized, there is substantially no magnetic field at the switch 72, and the switch opens. Leads from the switch 72 may be run to the same remote location as the leads to the electromagnet 71, so that the valve may be closed and its closed status indicated remotely.

FIG. 9 shows another modification of the invention wherein a ferromagnetic ball 73 replaces the armature 15–17. Electromagnet 71 in FIG. 9 lifts up ball 73 in a manner similar to the lifting of the armature in FIGS. 5 and 8. The magnetic cooperation of the ball 73, electromagnet core 76, arm-holding magnet 5, and magnetic switch 72 are the same as in FIG. 8. The lifted position of the ball 73 is indicated in dashed lines at 73'. When the ball 73 is in this lifted position, the magnetic path between it and magnet 5 on arm 4 is suitably lengthened, the attraction decreases, and arm 4 drops down into the "closed" position. The basic ball mechanism alone, minus the above magnetic elements, is shown in my prior U.S. Pat. No. 5,209,454 in its FIGS. 10–13.

We claim:

1. An automatic safety shutoff valve comprising a body and a flapper arm fixed to a shaft and swingable between a downward valve-closed position and an upward valve-open position and having a first flapper arm magnet in its outer portion, and further comprising:

an armature of soft ferromagnetic material and movable between a normal and a displaced position, said first magnet holding said flapper arm up by attraction to said armature when said armature is in said normal position, and when in said displaced position releasing said arm to swing downward to said valve-closed position, and controllable magnetic means to raise said armature upward to a said displaced position to effect emergency closure of said valve; and further comprising:

a second magnet in said arm adjacent to its inner end near said shaft, and a third magnet in said body disposed to attract said second magnet to hold said valve closed when said arm is in said valve-closed position.

2. A valve as in claim 1, further comprising:

a first facet on said shaft disposed to face upward when said arm is in said valve-open position, a second facet on said shaft disposed to face upward when said arm is in said valve-closed position, position-identifying indicia on said facets, and a window in the top portion of said body to view the status of said valve.

3. A valve as in claim 1, wherein said controllable magnetic means comprises:

a short vertical shaft carrying a magnet arm (62) with a closure magnet in its outer portion, and rotatable to move said closure magnet between a closing position above said armature or to a neutral position away therefrom, said magnet in said closing position raising said armature upward to effect closure of said valve; and a return spring to urge said magnet arm to said neutral position.

4. A valve as in claim 1, wherein said controllable magnetic means comprises:

an electromagnet (71) disposed above said armature and adapted to raise said armature to a said displaced position when energized, and further comprising a magnetically-actuable switch disposed adjacent said electromagnet and indicating the status of said valve, said switch being magnetized from said first flapper arm magnet through said armature and the core of said electromagnet when said flapper arm is in said upward position.

5. A valve as in claim 4, wherein:

said armature is in the form of a ball having ferromagnetic properties (73).

* * * * *